(12) United States Patent
Malloy, III

(10) Patent No.: US 10,672,524 B2
(45) Date of Patent: Jun. 2, 2020

(54) PASSIVE INTEGRAL ISOLATION VALVE

(71) Applicant: BWXT mPower, Inc., Charlotte, NC (US)

(72) Inventor: John D. Malloy, III, Goode, VA (US)

(73) Assignee: BWXT mPower, Inc., Charlotte, NC (US)

(*) Notice: Subject to any disclaimer, the term of this patent is extended or adjusted under 35 U.S.C. 154(b) by 258 days.

(21) Appl. No.: 14/877,048

(22) Filed: Oct. 7, 2015

(65) Prior Publication Data

US 2016/0180974 A1  Jun. 23, 2016

Related U.S. Application Data

(60) Provisional application No. 62/060,791, filed on Oct. 7, 2014.

(51) Int. Cl.
| | |
|---|---|
| *G21C 7/32* | (2006.01) |
| *G21C 15/243* | (2006.01) |
| *G21D 3/04* | (2006.01) |
| *G21C 13/02* | (2006.01) |
| *F16K 1/38* | (2006.01) |

(Continued)

(52) U.S. Cl.
CPC ............ *G21C 15/243* (2013.01); *F16K 1/385* (2013.01); *F16K 15/186* (2013.01); *G21C 1/32* (2013.01); *G21C 13/02* (2013.01); *G21C 15/14* (2013.01); *G21C 19/307* (2013.01); *G21D 3/04* (2013.01); *Y02E 30/40* (2013.01)

(58) Field of Classification Search
CPC .................................................. F16K 17/003
See application file for complete search history.

(56) References Cited

U.S. PATENT DOCUMENTS

| 3,814,375 A | 6/1974 | Grotloh |
|---|---|---|
| 5,120,490 A | 6/1992 | Koshiishi et al. |

(Continued)

FOREIGN PATENT DOCUMENTS

| FR | 2 102 041 A5 | 3/1972 |
|---|---|---|
| FR | 2 328 188 A1 | 5/1977 |
| FR | 2 723 165 A1 | 2/1996 |

OTHER PUBLICATIONS

International Search Report and Written Opinion dated Mar. 4, 2016 for International Application No. PCT/US15/54430.

(Continued)

*Primary Examiner* — Marshall P O'Connor
(74) *Attorney, Agent, or Firm* — Nelson Mullins Riley & Scarborough LLP

(57) ABSTRACT

A valve assembly includes a flange connected to a vessel penetration of a reactor pressure vessel of a nuclear reactor. A valve is disposed inside the flange or protrudes from the flange into the vessel penetration. The valve includes a valve seat and a movable valve member positioned so that pressure inside the reactor pressure vessel urges the movable valve member against the valve seat to close the valve. The valve assembly further includes a plenum having an inlet via which the plenum can be pressurized to apply pressure to the movable valve member that urges the movable valve member away from the valve seat to open the valve. The plenum may be defined in part by a surface of the movable valve member. The valve assembly preferably does not include a valve actuator.

19 Claims, 4 Drawing Sheets

(51) Int. Cl.
*G21C 19/307* (2006.01)
*G21C 15/14* (2006.01)
*G21C 1/32* (2006.01)
*F16K 15/18* (2006.01)

(56) References Cited

U.S. PATENT DOCUMENTS

| | | | | |
|---|---|---|---|---|
| 5,684,846 | A * | 11/1997 | Meneely | G21C 9/00 376/247 |
| 6,026,138 | A | 2/2000 | Hartmann et al. | |
| 2004/0084088 | A1 | 5/2004 | Callies | |
| 2004/0244841 | A1* | 12/2004 | Modro | F16K 15/06 137/529 |
| 2013/0070887 | A1* | 3/2013 | Kim | G21C 15/18 376/282 |
| 2013/0272478 | A1* | 10/2013 | Malloy, III | G21C 13/02 376/352 |
| 2013/0294567 | A1 | 11/2013 | Malloy, III et al. | |

OTHER PUBLICATIONS

Office Action, Chinese Application No. 201580054795.7 dated Sep. 18, 2018, 25 pages.

Supplementary European Search Report, European Application No. 15863135, dated May 7, 2018, 8 pages.

* cited by examiner

PASSIVE INTEGRAL ISOLATION VALVE

CLAIM OF PRIORITY

This application claims priority to U.S. Provisional Patent Application No. 62/060,791, filed Oct. 7, 2014, the entire disclosure of which is incorporated herein.

This invention was made with Government support under Contract No. DE-0000583 awarded by the Department of Energy. The Government has certain rights in this invention.

BACKGROUND

The following pertains to the nuclear reactor arts, nuclear power arts, nuclear reactor safety arts, and related arts.

Existing nuclear power plants are typically light water thermal nuclear reactors of the boiling water reactor (BWR) or pressurized water reactor (PWR) designs. In such a reactor, a nuclear reactor core comprising fissile material (typically a uranium compound such as $UO_2$ enriched in fissile $^{235}U$) is disposed in coolant (purified water) contained at an operational pressure and temperature in a reactor pressure vessel. A nuclear chain reaction involving fission of the fissile $^{235}U$ generates heat in the nuclear reactor core which is transferred to the coolant. In a BWR design, the heat directly converts coolant to steam, that is used to drive a turbine, while in a PWR design, the primary coolant remains in a liquid state (e.g. subcooled) and converts secondary coolant to steam in a steam generator—this secondary coolant steam is then used to drive the turbine. In conventional PWR designs the steam generator is a component external from the reactor pressure vessel that contains the nuclear reactor. In so-called integral PWR designs, the steam generator is located integrally inside the reactor pressure vessel with (typically above) the nuclear reactor core. The integral PWR design advantageously reduces the number of large-diameter vessel penetrations carrying primary coolant. In some contemplated PWR designs, these vessel penetrations may be limited to primary coolant let-down and make-up lines, and emergency core cooling (ECC) connections.

Safe operation of a nuclear reactor includes providing protection against radiological release to the environment. To this end, it is known to surround the nuclear reactor with a radiological containment structure typically constructed of steel and/or steel-reinforced concrete, and to implement safety systems, with redundancy, to remediate events in which reactor operation moves outside of a design envelope. One class of events is a loss of coolant accident (LOCA), in which reactor coolant escapes from a reactor pressure vessel break or, more commonly, from a break in a large-diameter pipe that connects with the reactor pressure vessel at a vessel penetration. A LOCA break which occurs between the vessel penetration and a closest pipe valve is particularly problematic, since reactor coolant loss from such a break continues even after the pipe valve is closed. A known solution is to provide an integral isolation valve (IIV) at the vessel penetration. An IIV comprises a valve built into a flange that connects with the pressure vessel. Since the IIV is integrated directly into the vessel penetration, closing the IIV ensures stoppage of reactor coolant loss at the LOCA break. Some IIV designs are disclosed in Malloy III et al., U.S. Pub. No. 2013/0272478 A1 published Oct. 7, 2013, and in Malloy III et al., U.S. Pub. No. 2013/0294567 A1 published Nov. 7, 2013.

An IIV protecting the make-up line can be constructed as a check valve (or two check valves in series to provide redundancy) that is oriented to prevent flow of coolant out of the nuclear reactor. A check valve(s) is suitable because the make-up coolant flows into the reactor vessel. On the other hand, an IIV protecting the let-down line is more difficult. This is because the let-down coolant flows out of the reactor, so that a check valve design would prevent normal let-down operation. Accordingly, IIV designs for the let-down line typically employ a motor-operated valve.

BRIEF SUMMARY

In some embodiments described herein as illustrative examples, a valve assembly is configured for connection to a vessel penetration of a reactor pressure vessel of a nuclear reactor. The valve assembly comprises: a flange configured to connect with the vessel penetration; a valve body disposed inside the flange or arranged to protrude from the flange into the vessel penetration when the flange is connected with the vessel penetration; a valve comprising a valve seat and a movable valve member, the valve disposed inside the valve body with the movable valve member positioned so that pressure inside the reactor pressure vessel urges the movable valve member against the valve seat to close the valve; and a plenum defined between the valve body and the movable valve member and having an inlet. The plenum is configured such that pressurization of the plenum via the inlet urges the movable valve member away from the valve seat to open the valve. In embodiments in which the valve body is disposed inside the flange, it may be formed integrally with the flange, or separate from the flange and mounted inside the flange. The plenum may comprise a plurality of plenum regions arranged around the movable valve member, with the movable valve member including protrusions extending into the plenum regions. The plenum regions may be slots arranged around the movable valve member and aligned with the direction of travel of the movable valve member. The valve assembly preferably does not include a valve actuator.

In some embodiments described herein as illustrative examples, a system for protecting a vessel penetration of a nuclear reactor pressure vessel of a nuclear reactor includes a valve assembly as set forth in the immediately preceding paragraph having its flange connected with the vessel penetration, and further includes a valve assembly control line comprising a fluid line connected with the inlet of the plenum of the valve assembly, and a pilot valve disposed on the valve assembly control line. The system may further include a reactor coolant inventory and purification system (RCIPS) including a make-up line supplying make-up coolant water to the reactor pressure vessel, with the valve assembly control line connected with the make-up line. In such an embodiment, the valve assembly may be connected to a let-down line of the RCIPS to remove let-down coolant water from the reactor pressure vessel.

In some embodiments described herein as illustrative examples, a valve assembly is configured for connection to a vessel penetration of a reactor pressure vessel of a nuclear reactor. The valve assembly comprises a flange configured to connect with the vessel penetration, and a valve disposed inside the flange or arranged to protrude from the flange into the vessel penetration when the flange is connected with the vessel penetration. The valve includes a valve seat and a movable valve member positioned so that pressure inside the reactor pressure vessel urges the movable valve member against the valve seat to close the valve. The valve assembly further includes a plenum having an inlet via which the plenum can be pressurized to apply pressure to the movable valve member that urges the movable valve member away from the valve seat to open the valve. In one illustrative configuration, the flange is a spool flange including spaced apart first and second flange lips connected by a hollow channel, with the valve is disposed inside the spool flange. In some embodiments the valve assembly further includes a cylindrical valve body mounted on the flange, with the cylindrical valve body containing the valve, and the cylindrical valve body sized to insert coaxially into a vessel penetration comprising a cylindrical bore passing through a wall of the reactor pressure vessel when the flange is connected with the vessel penetration. The plenum may be defined in part by a surface of the movable valve member. The valve assembly preferably does not include a valve actuator.

In some embodiments described herein as illustrative examples, a system includes a nuclear reactor comprising a reactor pressure vessel having a vessel penetration and a nuclear reactor core including fissile material contained in a lower portion of the reactor pressure vessel, a valve assembly as set forth in the immediately preceding paragraph having its flange connected with the vessel penetration, a valve assembly control line comprising a fluid line connected with the inlet of the plenum of the valve assembly, and a pilot valve disposed on the valve assembly control line. The system may further include a reactor coolant inventory and purification system (RCIPS) including a let-down line connected with the vessel penetration via the valve assembly to remove let-down coolant water from the reactor pressure vessel. The RCIPS may further include a make-up line supplying make-up coolant water to the reactor pressure vessel, in which the make-up line is also connected to the valve assembly control line to pressurize the plenum of the valve assembly with make-up coolant water from the make-up line. The system may further include a radiological containment structure including a reactor cavity in which is disposed the lower portion of the reactor pressure vessel that contains the nuclear reactor core, with the valve assembly located closer to the reactor cavity than the pilot valve. For example, the valve assembly may be disposed inside the reactor cavity and the pilot valve disposed outside of the reactor cavity.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

Figure 1:
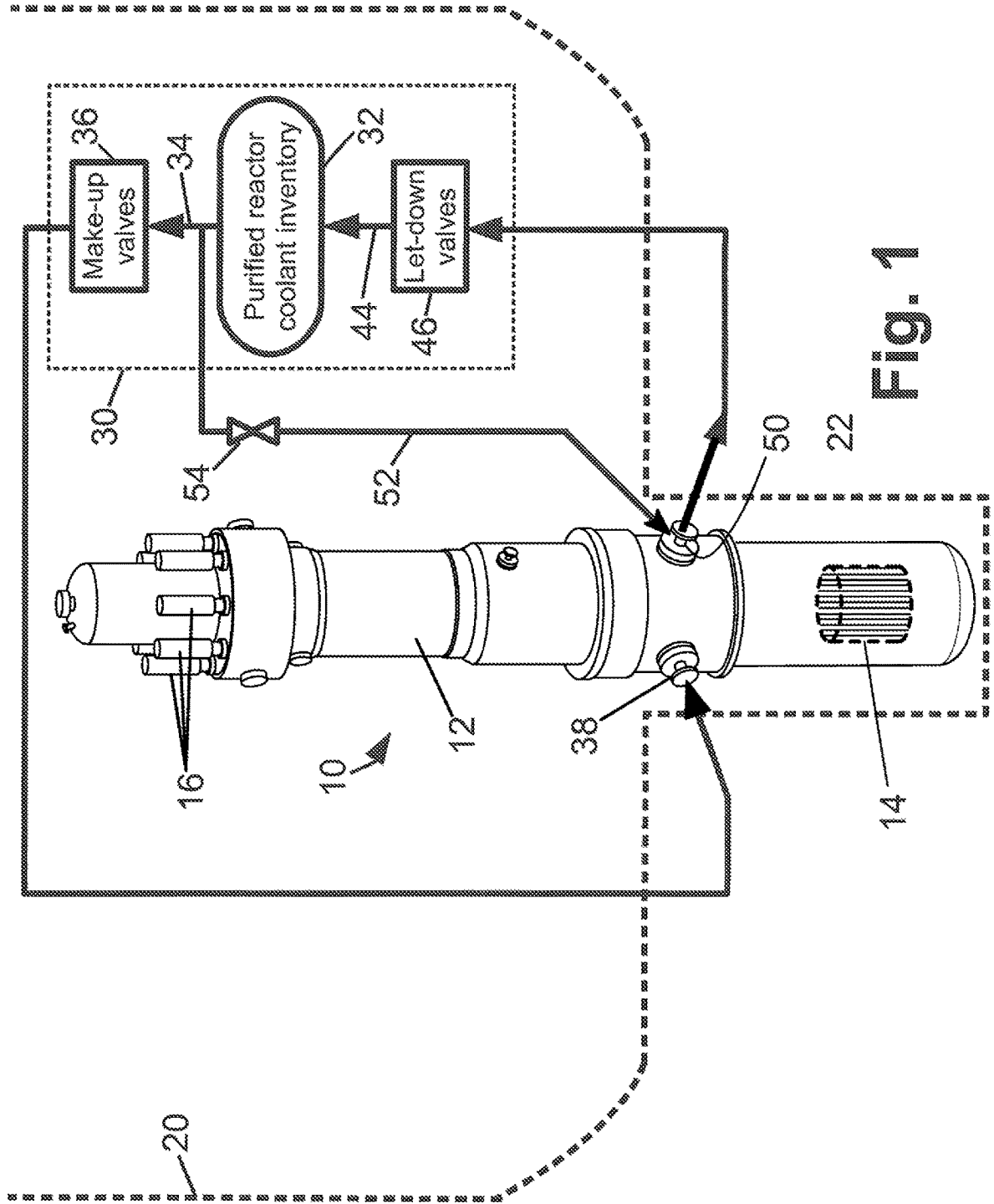
FIG. 1 diagrammatically shows a nuclear reactor and a portion of the surrounding radiological containment structure including the reactor cavity, along with a reactor coolant inventory/purification system (RCIPS) having make-up and let-down lines protected by integral isolation valves (IIV's) as disclosed herein.

It is recognized herein that existing motor-driven integral isolation valve (IIV) designs for the let-down line have certain deficiencies. The motor driving the IIV must respond and operate quickly in order to isolate a pipe break on the let-down line. The motor also takes up space proximate to the nuclear reactor, and may also disrupt reactor thermal insulation in the area proximate to the IIV. In addition, the motor must be robust and reliable in the presence of high temperature and high radiation levels adjacent to the reactor vessel.

In IIV designs disclosed herein, a valve mounted in the IIV flange or protruding from the flange into the vessel penetration has its movable valve member positioned so that pressure inside the reactor pressure vessel urges the movable valve member against the valve seat to close the valve. The disclosed IIV designs further include a plenum having an inlet. When the plenum is pressurized by a fluid, the pressure inside the plenum urges the movable valve member away from the valve seat to open the valve. In one suitable design, the plenum comprises a plurality of plenum regions, such as slots oriented parallel with the direction of travel of the movable valve member, and the movable valve member includes protrusions that extend into the slots so that pressurized fluid in the plenum slots presses against the protrusions to urge the movable valve member away from the valve seat to open the valve.

In these IIV designs, the valve is open whenever the pressure in the plenum is high enough to impose an opening force that is larger than the closing force applied by pressure in the reactor pressure vessel. It follows that the IIV will close under two conditions: (1) the plenum pressure is removed or reduced to a level that is unable to keep the valve open, or (2) the pressure inside the pressure vessel rises to a level sufficient to overcome the applied plenum pressure and close the valve (this is a vessel overpressurization situation in which other, dedicated pressure relief valves and/or emergency core cooling, i.e. ECC, systems are activated). Pressure in the plenum can be controlled by a remote pilot valve anywhere on the control line feeding fluid into the plenum. Because loss of pressure in the plenum results in a failsafe closure of the IIV, a break on the control line cannot generate a loss of coolant accident (LOCA).

If the source of pressurized fluid to the control line is lost, the IIV will again close, providing failsafe operation. In some disclosed embodiments, this source of pressurized fluid is the make-up line of a reactor coolant inventory and purification system (RCIPS). Connecting the control line of the IIV to the make-up one of the RCIPS provides a convenient pressurization source already located inside the radiological containment. This arrangement also ensures that the IIV will close upon onset of any RCIPS failure mode that causes depressurization of the make-up line. Another advantage of using the make-up line as the fluid source for the control line is that if the plenum is leaky so that fluid from the plenum can leak into the flow stream of the IIV, this merely introduces purified coolant water into the flow stream.

In the illustrative embodiments presented herein, the disclosed IIV designs are presented in the context of protecting a let-down line of the RCIPS, which is a typical contemplated application. However, it will be appreciated that the disclosed IIV designs are suitably applied to protect any vessel penetration that may carry coolant water out of the pressure vessel. The disclosed IIV designs are also contemplated for use in protecting vessel penetrations such as the make-up line that exclusively carry coolant into the pressure vessel, although for such applications a simpler check valve IIV design may be more cost-effective.

With reference to FIG. 1, a nuclear reactor 10 comprises a reactor pressure vessel 12 containing various components including a nuclear reactor core 14 comprising fissile material. The nuclear reactor core 14 is shown in phantom to diagrammatically indicate its location in the lower portion off the pressure vessel 12—as the reactor core is contained inside the lower portion of the pressure vessel 12 it is actually occluded from view. In typical commercial light water reactor designs, the nuclear reactor core 14 comprises fuel rods containing $UO_2$ in which the uranium is enriched in the fissile $^{235}U$ isotope (typically enriched to a level of 5% or less in commercial nuclear reactors, although higher enrichment is contemplated), and fuel rods are typically oriented vertically and held in a spaced array by spacer grid components (details not shown). During normal operation of the nuclear reactor 10, the reactor pressure vessel 12 is filled with (primary) coolant water that is kept at a design operational pressure and temperature due to thermal energy generated by a nuclear chain reaction in the reactor core 14 balanced by heat sinking provided by circulating the coolant water through a heat sink. The heat sink mechanism may, for example, be a steam generator in the case of a pressurized water reactor (PWR) design, or direct boiling of the coolant in the pressure vessel with the steam piped to drive a turbine in the case of a boiling water reactor (BWR) design. The illustrative PWR design is an integral PWR design in which the steam generator is disposed inside the pressure vessel 12 (internal steam generator not shown in FIG. 1); in a more conventional PWR design the steam generator is an external component connected with the pressure vessel by large-diameter piping. Other components not shown in FIG. 1 may also be contained in the pressure vessel 12, such as a central riser or other coolant circulation control, control rods and associated drive mechanisms (which may alternatively be located outside of the pressure vessel), heating elements and spargers in an internal pressurizer at the top of the pressure vessel 12 to provide pressure control (alternatively, an external pressurizer may be connected via suitable piping), and so forth. The illustrative PWR 10 includes external reactor coolant pump (RCP) units whose motors 16 are located externally near the top of the reactor pressure vessel 12, but other internal or external RCP configurations are contemplated, as well as alternative "natural circulation" reactor designs in which coolant circulation is driven by heat generated in the reactor core. In the case of a BWR, the pressure vessel may suitably contain steam handling components (dryers, et cetera). These are merely illustrative examples, and it is to be understood that the disclosed IIV designs are suitably employed in conjunction with substantially any type of nuclear reactor that contains pressurized coolant. As a further example, the disclosed IIV designs are contemplated for use with a heavy water reactor in which the coolant is heavy water (i.e. deuterium) and the reactor core includes $UO_2$ that is typically less enriched with $^{235}U$ or may even be unenriched uranium (having natural abundance of about 0.7% $^{235}U$).

With continuing reference to FIG. 1, the nuclear reactor 10 is contained in a radiological containment structure 20, which is typically a steel or steel-reinforced concrete structure surrounding the nuclear reactor 10. For illustrative purposes, only a lower portion of the radiological containment structure 20 is diagrammatically shown in FIG. 1 using dashed lines. The illustrative radiological containment structure 20 is includes a reactor cavity 22 in which is disposed the lower portion of the reactor pressure vessel 12 that contains the nuclear reactor core 14. In the event of a loss of coolant accident (LOCA) or other event producing excessive heating of the nuclear reactor core 14, the reactor cavity 22 can be flooded from water in a refueling water storage tank (RWST, not shown) located inside the containment structure 20 to assist in cooling. Although radiation shielding including neutron shields are typically provided around the reactor core, a high concentration of neutrons is typically generated by the reactor core 14 outside the containing lower portion of the reactor pressure vessel 12 during normal operation of the nuclear reactor 10. As a consequence, the gap between the pressure vessel 12 and the walls of the reactor cavity 22 is a relatively high radiation environment, and the radiation level decreases with increasing elevation above the top of the reactor cavity 22.

During normal operation of the nuclear reactor 10, adjustments are made to the coolant water inventory inside the pressure vessel 12. To this end, a reactor coolant inventory and purification system (RCIPS) 30 includes a purified reactor coolant inventory 32 external to the reactor pressure vessel 12. A make-up line 34 provides a source of purified make-up coolant water at a pressure sufficient for injection into the pressure vessel 12. Because the coolant in the pressure vessel 12 is maintained at an operational reactor pressure $P_{reactor}$, the make-up line 34 suitably provides a pressure head $P_{make-up}$ via suitable pumping (not shown) that is higher than the reactor pressure $P_{reactor}$ so that the make-up coolant water can be injected into the pressure vessel 12 against the internal pressure $P_{reactor}$. Make-up valves 36 control delivery of make-up purified coolant water to the reactor pressure vessel 12 via a make-up line vessel penetration that is optionally protected by an integral isolation valve (IIV) 38. Because the make-up line 34 delivers the make-up coolant water into the nuclear reactor pressure vessel 12, the make-up line IIV 38 can be suitably constructed as a check valve that permits flow into the reactor pressure vessel 12 but blocks flow out of the reactor pressure vessel 12. Advantageously, the make-up line IIV 38 is a passive check valve that does not include a motor or other valve actuator, and accordingly the make-up line IIV 38 can be placed inside the reactor cavity 22 as shown, or near the top of the reactor cavity, which is a high radiation and heat environment.

The RCIPS 30 also includes a let-down line 44 to remove let-down coolant water from the reactor pressure vessel 12. Let-down valves 46 control removal of let-down coolant water from the reactor pressure vessel 12 via a let-down line vessel penetration that is optionally protected by an integral isolation valve (IIV) 50. Because the let-down line 44 removes let-down coolant from the pressure vessel 12, the let-down line IIV 50 cannot be a check valve since the check valve would prevent normal let-down operation. A conventional solution is to employ an active valve as the let-down IIV. As already noted, however, this approach is problematic. The motor or other actuator driving the active valve must respond and operate quickly in order to isolate the let-down line 44 in the event of a break. The motor or other valve actuator also takes up space proximate to the nuclear reactor 10, and may disrupt reactor thermal insulation. In addition, in the illustrative example in which the let-down line is located inside the reactor cavity or near the top of the reactor cavity, the motor or other valve actuator must be robust and reliable in the presence of the high temperature and high radiation level in this area.

In embodiments disclosed herein, the let-down IIV 50 is a valve assembly 50 that is normally kept closed by the pressure $P_{reactor}$ inside the reactor pressure vessel 12, and is opened by application of pressure to a plenum within the valve assembly 50 applied via a valve assembly control line 52. A pilot valve 54 on the control line 52 enables the valve assembly 50 to be closed by valving off this pressure. In the illustrative example of FIG. 1, the valve assembly control line 52 is connected to the make-up line 34 to provide the pressure to the plenum.

Figure 2:
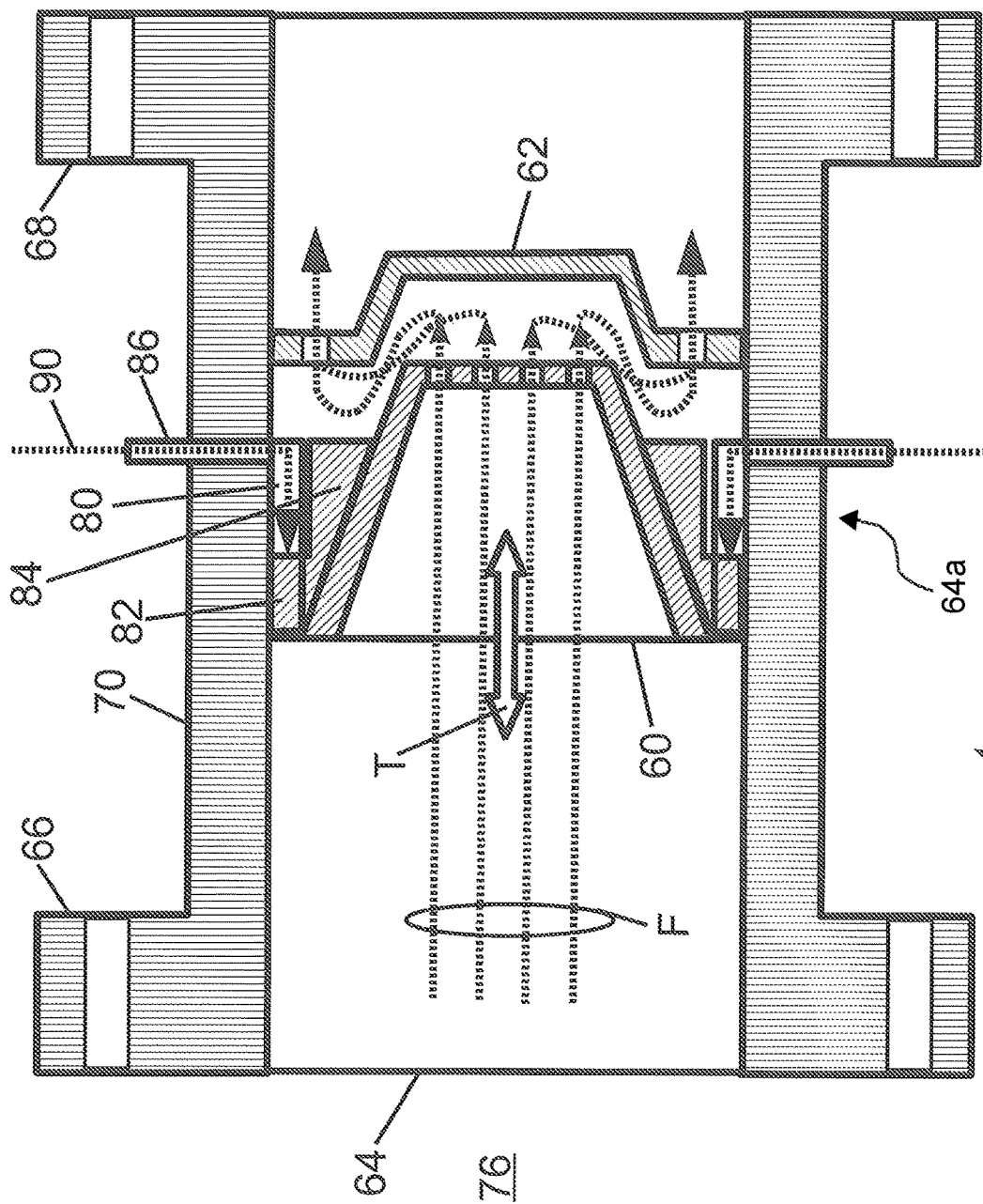
FIG. 2 diagrammatically shows an illustrative embodiment of the IIV protecting the let-down line of FIG. 1 with the valve in its open position (permitting let-down coolant flow).
Figure 3:
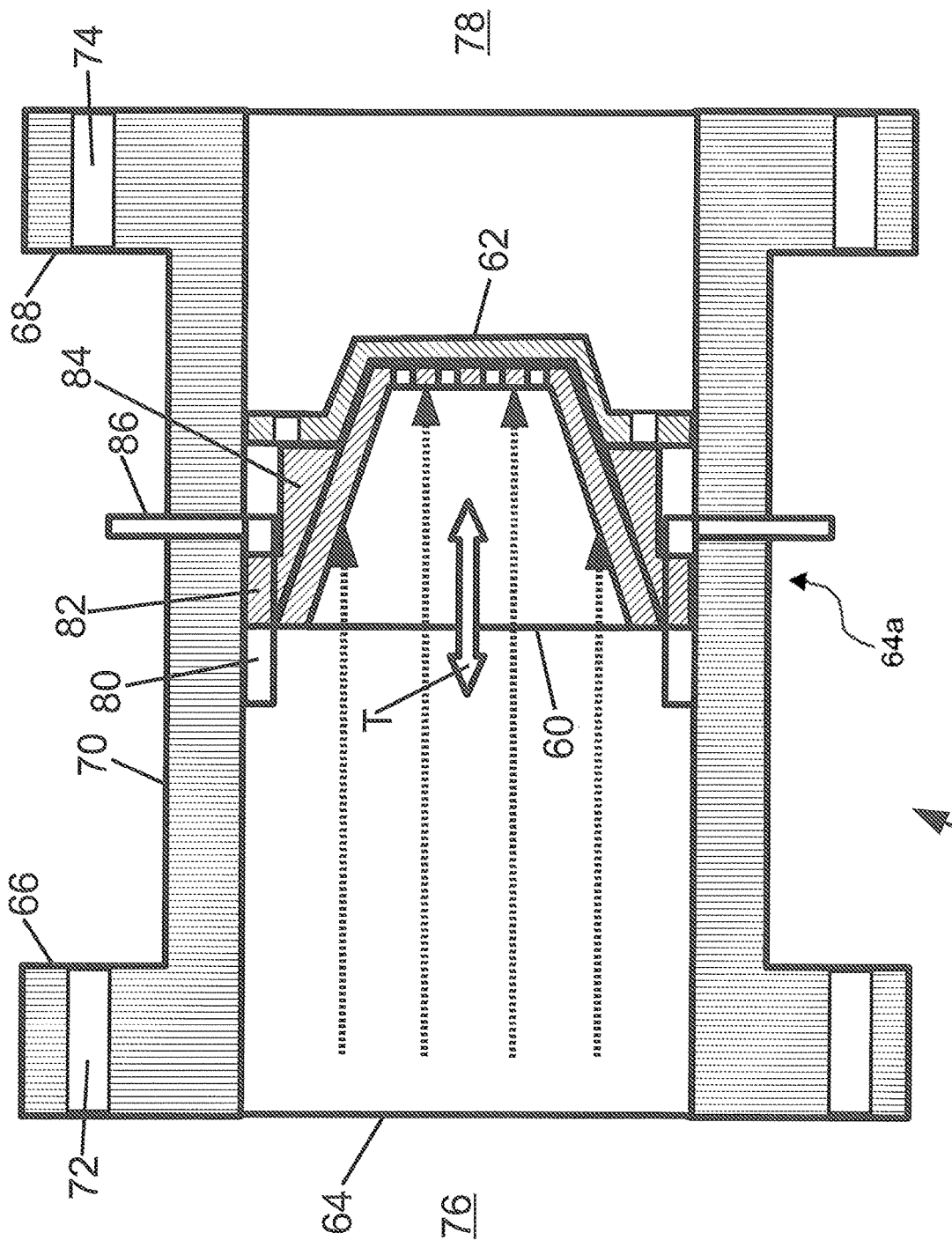
FIG. 3 diagrammatically shows the IIV of FIG. 2 with the valve in its closed position (preventing coolant loss from the reactor via the let-down line).

With reference now to FIGS. 2 and 3, an illustrative embodiment of the valve assembly 50 is shown in its open state (FIG. 2) and in its closed state (FIG. 3). The illustrative valve assembly 50 of FIGS. 2 and 3 includes a movable valve member 60 and a valve seat 62 disposed in a flange 64. In this illustrative embodiment the flange 64 is a spool flange including spaced apart first and second flange lips 66, 68 connected by a hollow channel 70, and the valve including the movable valve member 60 and the valve seat 62 is disposed inside the spool flange 64. The first flange lip 66 includes bore holes 72 or other fastening features that enable the first flange lip 66 to be secured in a sealed fashion to the let-down line penetration of the pressure vessel 12. The second flange lip 68 includes bore holes 74 or other fastening features that enable the second flange lip 68 to be secured in a sealed fashion to a coupling (not shown) to the valve assembly control line 52. Thus, the first flange lip 66 faces the reactor pressure vessel side 76 and the second flange lip 68 faces the control line side 78. By comparing FIGS. 2 and 3, it is seen that the movable valve member moves in a direction of travel T indicated in FIGS. 2 and 3.

The valve assembly 50 further includes a plurality of plenums 80 which in this illustrative example are shaped as plenum slots 80 arranged around the movable valve member 60 and aligned with the direction of travel T of the movable valve member 60. The movable valve member 60 includes protrusions 82 that extend into the slots 80. The valve member 60 also defines the containment of the plenum slots 80, in the illustrative example of FIGS. 2 and 3 by having the protrusions 82 include lateral extensions 84 that run parallel with the slots 80. Thus, in the illustrative example of FIGS. 2 and 3, each plenum slot 80 is defined by walls including a portion of the inner diameter of the hollow channel 70 of the spool flange 64, and by the protrusion 82 and lateral extension 84 of the movable valve member 60. Said another way, the plenum slots 80 are defined between the valve body 64a (which is integral with the spool flange 64) and the movable valve member 60. The plenum slots 80 have one or more inlets 86 that are connected with the valve assembly control line 52.

With reference to FIG. 2, the open position of the valve assembly 50 is shown. To keep the valve open, pressurization 90 is applied from the control line 52 to the plenums 80 via the inlets 86. With brief reference back to FIG. 1, assuming the make-up line 34 is pressurized, the plenum pressurization 90 is applied by opening the pilot valve 54. The movable valve member 60 experiences a force (acting toward the right in the orientation shown in FIG. 2) equal to the reactor pressure $P_{reactor}$ times the area of the movable valve member 60 projected along the direction of travel T, which urges the movable valve member 60 against the valve seat 62 to close the valve. To keep the valve assembly 50 in its open position depicted in FIG. 2 contrary to this force, the force applied to the protrusions 82 by the plenum pressurization 90 (acting toward the left in the orientation shown in FIG. 2) must be large enough to overcome the closing force due to reactor pressure $P_{reactor}$. Since the pressure in the make-up line 34 is high enough to overcome the reactor pressure $P_{reactor}$ in order to force make-up coolant into the reactor pressure vessel 12 (when the make-up valves 36 are opened), a sufficient force to keep the valve open is readily achieved. The travel of the movable valve member 60 toward the open position (that is, toward the left in the orientation shown in FIG. 2) is stopped when the protrusions 82 contact the extreme (left) end of the plenum slots 80. With the movable valve member 60 held in this leftmost position, as shown in FIG. 2, by the pressure applied to the plenums 80 via the inlets 86, a coolant water flow F flows through openings in the movable valve member 60 and through openings in the valve seat 62. This coolant water flow F is the let-down flow into the let-down line 44. It should be noted that the let-down flow F will only flow when: (1) the integral isolation valve assembly 50 is in its open position as shown in FIG. 2 and (2) the let-down valves 46 are also open to admit let-down flow F to the RCIPS 30. During normal reactor operation, the plenum pressurization 90 is maintained by keeping pilot valve 54 open, and let-down operations are actually controlled by the let-down valves 46. If the plenums 80 are well-sealed, then the fluid flow into the inlets 86 is essentially zero except during initial pressurization of the plenums 80 (that is, except when the pilot valve 54 is first opened). In practice, the sealing of the plenums 80 provided by the protrusions 82 and lateral extensions 84 of the movable valve member 60 may be imperfect. In this case some small leakage flow may be present in the control line 52. If the make-up line 34 provides the pressurization fluid, as in the illustrative example of FIG. 4, this small leakage flow is not problematic since it combines with the main let-down flow F and comprises purified coolant water from the RCIPS 30.

With reference now to FIG. 3, the closed position of the integral isolation valve assembly 50 is described. To close the valve, the plenum pressurization 90 is removed, which removes the (illustrative leftward) force opposing the (illustrative rightward) force provided by the reactor pressure $P_{reactor}$. Now unopposed, the (rightward) force due to the reactor pressure $P_{reactor}$ moves the movable valve element 60 toward the valve seat 62 until the movable valve element 60 seats against the valve seat 62, as shown in FIG. 3, to close the valve. This will occur if the plenum pressurization 90 is removed completely, for example by closing the pilot valve 54. This valve closure will also occur if the force urging the valve open due to the plenum pressurization 90 becomes smaller than the force urging the valve closed due to the reactor pressure $P_{reactor}$. This latter event can occur if the pressure in the RCIPS make-up line 34 drops sufficiently, or if the reactor pressure $P_{reactor}$ increases sufficiently due to a reactor overpressurization condition.

Figure 4:
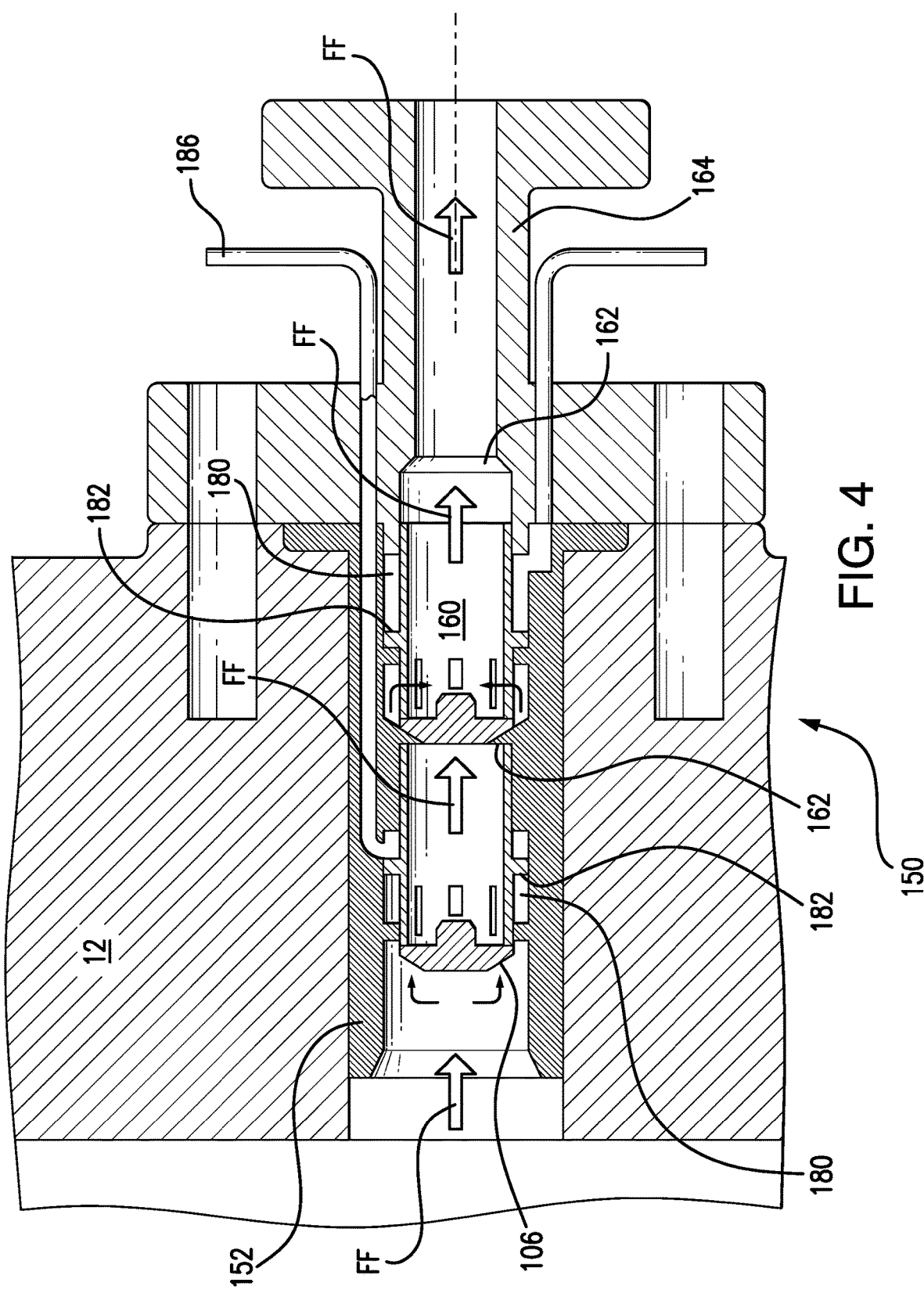
FIG. 4 diagrammatically shows another illustrative embodiment of the IIV protecting the let-down line of FIG. 1.

With reference to FIG. 4, another illustrative embodiment of the let-down integral isolation valve assembly is shown, labeled as valve assembly 150. The embodiment of FIG. 4 employs a valve body 152 that is mounted on a flange 164 and protrudes from the flange 164 into the vessel penetration of the pressure vessel 12 when the flange 164 is connected with the vessel penetration. The valve assembly 150 includes two movable valve members 160 and mating valve seats 162 to provide redundancy. For illustrative purposes, the valve on the left in FIG. 4 is shown in its closed position (movable valve member 160 in its rightmost position seated against the valve seat 162), while the valve on the right in FIG. 4 is shown in its open position (movable valve member 160 in its leftmost position away from the valve seat 162). Note that while most of the valves are in the valve body 152, the valve seat 162 for the right-hand valve is in the flange 164. The valve includes plenum slots 180 into which extensions 182 of the movable valve members 160 extend. However, in the embodiment of FIG. 4, the lateral extensions 84 of the embodiment of FIGS. 2 and 3 are omitted and functionally replaced by constructing the movable valve members 160 as cylindrical elements whose outer surfaces serve (together with the protrusions 180) to seal the plenum slots 180. Said another way, the plenum slots 180 are defined between the valve body 152 and the movable valve member 160. Inlets 186 are suitably connected with the valve assembly control line 52 (see FIG. 1) so that the integral isolation valve 150 can be kept in its open position by opening pilot valve 54 or closed by closing pilot valve 54. In the open position, arrows FF indicate let-down coolant flow through the integral isolation valve assembly 150.

While the illustrative embodiments employ spool flanges, the disclosed integral isolation valve assemblies can be constructed using other types of flanges. For example, the spool flange can be replaced by a single-sided flange having a flange lip that is bolted to the reactor pressure vessel 12 at the vessel penetration and on the opposite side has a nipple or other pipe coupling for connecting to the control line 52. While the illustrative embodiment of FIG. 1 employs the RCIPS make-up line 34 as the pressurized fluid source for pressurizing the plenums 80, 180, which has certain advantages as described herein, it is contemplated to use another pressurized fluid source for this purpose. As another variant, it is contemplated to form the plenum slots as grooves formed into the movable valve element, so that the protrusions of the movable valve element are recessed into the movable valve body.

The integral isolation valve assembly 50, 150 preferably does not include a valve actuator. Rather, the isolation valve assembly 50, 150 is operated remotely by action of the pilot valve 54, which may be an active valve but can be located away from the high temperature, high radiation environment of the nuclear reactor 10. To reduce radiation exposure of the pilot valve 54, the valve assembly 50, 150 is located closer to the reactor cavity 22 than the pilot valve 54. In illustrative FIG. 1, the valve assembly 50, 150 is disposed inside the reactor cavity 22 while the pilot valve 54 is disposed outside of the reactor cavity 22.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

I claim:

1. A valve assembly configured for connection to a vessel penetration of a reactor pressure vessel of a nuclear reactor, the valve assembly including:

a flange configured to connect with the vessel penetration, the flange including a first end, a second end, and a hollow channel extending therebetween;

a valve body disposed inside the flange or arranged to protrude from the flange into the vessel penetration when the flange is connected with the vessel penetration;

a valve comprising a valve seat and a movable valve member, the valve being disposed entirely inside the valve body with the movable valve member positioned so that pressure inside the reactor pressure vessel urges the movable valve member along a direction of travel against the valve seat to close the valve, the direction of travel of the movable valve member being parallel to a longitudinal center axis of the hollow channel of the flange; and a plenum defined between the valve body and the movable valve member and having an inlet, the plenum configured such that pressurization of the plenum via the inlet urges the movable valve member away from the valve seat along the direction of travel to open the valve.

2. The valve assembly of claim 1 wherein the valve body is disposed inside the flange and is one of (i) formed integrally with the flange and (ii) separate from the flange and mounted inside the flange.

3. The valve assembly of claim 1 wherein the valve body is mounted on the flange and arranged to protrude from the flange into the vessel penetration when the flange is connected with the vessel penetration.

4. The valve assembly of claim 1 wherein the plenum comprises a plurality of plenum regions arranged around the movable valve member and the movable valve member includes protrusions extending into the plenum regions.

5. The valve assembly of claim 4 wherein the plurality of plenum regions comprises a plurality of slots arranged around the movable valve member and aligned with the direction of travel of the movable valve member, and the protrusions of the movable valve member extend into the slots.

6. The valve assembly of claim 1 wherein the valve assembly does not include a valve actuator.

7. A system for protecting a vessel penetration of a nuclear reactor pressure vessel of a nuclear reactor, the system comprising:

a valve assembly comprising:

a flange connected with the vessel penetration, the flange including a first end, a second end, and a hollow channel extending therebetween;

a valve body disposed inside the flange or arranged to protrude from the flange into the vessel penetration when the flange is connected with the vessel penetration;

a valve comprising a valve seat and a movable valve member, the valve being disposed entirely inside the valve body with the movable valve member positioned so that pressure inside the reactor pressure vessel urges the movable valve member along a direction of travel against the valve seat to close the valve, the direction of travel of the movable valve member being parallel to a longitudinal center axis of the hollow channel of the flange;

a plenum defined between the valve body and the movable valve member and having an inlet, the plenum configured such that pressurization of the plenum via the inlet urges the movable valve member away from the valve seat along the direction of travel to open the valve;

a valve assembly control line comprising a fluid line connected with the inlet of the plenum of the valve assembly; and a pilot valve disposed on the valve assembly control line.

8. The system of claim 7 further comprising:

a reactor coolant inventory and purification system (RCIPS) including a make-up line supplying make-up coolant water to the reactor pressure vessel;

wherein the valve assembly control line is connected with the make-up line.

9. The system of claim 8 wherein the valve assembly is connected to a let-down line of the RCIPS to remove let-down coolant water from the reactor pressure vessel.

10. A valve assembly configured for connection to a vessel penetration of a reactor pressure vessel of a nuclear reactor, the valve assembly comprising:

a spool flange configured to connect with the vessel penetration, the spool flange including spaced apart first and second flange lips connected by a hollow channel having a longitudinal central axis;

a valve disposed entirely inside the valve body, the valve including a valve seat and a movable valve member positioned so that pressure inside the reactor pressure vessel urges the movable valve member along a direction of travel against the valve seat to close the valve, the direction of travel of the movable valve member being parallel to a longitudinal center axis of the hollow channel of the flange;

wherein the valve assembly further includes a plenum having an inlet via which the plenum can be pressurized to apply pressure to the movable valve member that urges the movable valve member away from the valve seat along the direction of travel to open the valve.

11. The valve assembly of claim 10 further comprising:

a cylindrical valve body mounted on the spool flange, the cylindrical valve body containing the valve, the cylindrical valve body sized to insert coaxially into a vessel penetration comprising a cylindrical bore passing through a wall of the reactor pressure vessel when the spool flange is connected with the vessel penetration.

12. The valve assembly of claim 10 wherein the plenum comprises a plurality of plenum regions arranged around the movable valve member, and the movable valve member includes protrusions extending into the plenum regions, wherein pressurizing the plenum regions via the inlet applies pressure to the protrusions to urge the movable valve member away from the valve seat to open the valve.

13. The valve assembly of claim 12 wherein the plurality of plenum regions comprises a plurality of slots arranged around the movable valve member and aligned with a direction of travel of the movable valve member, and the protrusions of the movable valve member extend into the slots.

14. The valve assembly of claim 10 wherein the valve assembly does not include a valve actuator.

15. A system comprising:

a nuclear reactor comprising a reactor pressure vessel having a vessel penetration and a nuclear reactor core including fissile material contained in a lower portion of the reactor pressure vessel;

a valve assembly comprising:

a flange connected with the vessel penetration, the flange including a first end, a second end, and a hollow channel extending the entire length of the flange therebetween;

a valve disposed entirely inside the valve body, the valve including a valve seat and a movable valve member positioned so that pressure inside the reactor pressure vessel urges the movable valve member along a direction of travel against the valve seat to close the valve, the direction of travel of the movable valve member being parallel to a longitudinal center axis of the hollow channel of the flange;

wherein the valve assembly further includes a plenum having an inlet via which the plenum can be pressurized to apply pressure to the movable valve member that urges the movable valve member away from the valve seat along the direction of travel to open the valve;

a valve assembly control line comprising a fluid line connected with the inlet of the plenum of the valve assembly; and a pilot valve disposed on the valve assembly control line.

16. The system of claim 15 further comprising:

a reactor coolant inventory and purification system (RCIPS) including a let-down line connected with the vessel penetration via the valve assembly to remove let-down coolant water from the reactor pressure vessel.

17. The system of claim 16 wherein the RCIPS further includes a make-up line supplying make-up coolant water to the reactor pressure vessel, the make-up line also connected to the valve assembly control line to pressurize the plenum of the valve assembly with make-up coolant water from the make-up line.

18. The system of claim 15 further comprising:

a radiological containment structure including a reactor cavity in which is disposed the lower portion of the reactor pressure vessel that contains the nuclear reactor core;

wherein the valve assembly is located closer to the reactor cavity than the pilot valve.

19. The system of claim 18 wherein the valve assembly is disposed inside the reactor cavity and the pilot valve is disposed outside of the reactor cavity.

* * * * *